(12) United States Patent
Favaro

(10) Patent No.: US 10,514,555 B2
(45) Date of Patent: Dec. 24, 2019

(54) SPECTACLES WITH INTERCHANGEABLE ARMS

(71) Applicant: SAFILO Società Azionaria Fabbrica Italiana Lavorazione Occhiali S.P.A., Pieve di Cadore (BL) (IT)

(72) Inventor: Mino Favaro, Padua (IT)

(73) Assignee: SAFILO SOCIETÀ AZIONARIA FABBRICA ITALIANA LAVORAZIONE OCCHIALI S.P.A., Pieve di Cadore (BL) (IT)

( * ) Notice: Subject to any disclaimer, the term of this patent is extended or adjusted under 35 U.S.C. 154(b) by 312 days.

(21) Appl. No.: 15/300,446

(22) PCT Filed: Apr. 1, 2015

(86) PCT No.: PCT/IB2015/052395
§ 371 (c)(1),
(2) Date: Sep. 29, 2016

(87) PCT Pub. No.: WO2015/155636
PCT Pub. Date: Oct. 15, 2015

(65) Prior Publication Data
US 2017/0123228 A1    May 4, 2017

(30) Foreign Application Priority Data

Apr. 7, 2014   (IT) .............................. PD2014A0093

(51) Int. Cl.
*G02C 5/14* (2006.01)
*G02C 5/16* (2006.01)
*G02C 5/22* (2006.01)

(52) U.S. Cl.
CPC ............... *G02C 5/146* (2013.01); *G02C 5/16* (2013.01); *G02C 5/2209* (2013.01);
(Continued)

(58) Field of Classification Search
USPC ......................................................... 351/116
See application file for complete search history.

(56) References Cited

U.S. PATENT DOCUMENTS 5,007,728 A    4/1991   Magorien
6,834,952 B2   12/2004  Polovin
(Continued)

FOREIGN PATENT DOCUMENTS

DE    4219039 A1      12/1993
FR    2875609 A1      3/2006
WO    2013006150 A1   1/2013

*Primary Examiner* — Ricky L Mack
*Assistant Examiner* — Gary W O'Neill
(74) *Attorney, Agent, or Firm* — Volpe and Koenig, P.C.

(57) ABSTRACT

Spectacles with interchangeable arms are provided a front frame with opposed lateral lugs for the hinged pivoting of the respective lateral arms, a device for the removable coupling of each arm to the frame, a first and a second coupling element are engaged in each other so as to be slidable from and towards a position of mutual retention, the elements being configured for quick disengagement from this position, the first coupling element being intended for the hinged connection to the respective lug of the frame, and the second element comprises a seat which is provided in the corresponding arm and which can be slidingly engaged by the first element, resiliently flexible retaining means being provided between the coupling elements of each arm to fix these elements to each other in a removable manner, by means of a snap-fitting coupling.

10 Claims, 3 Drawing Sheets

(52) U.S. Cl.
CPC ..... *G02C 2200/04* (2013.01); *G02C 2200/08* (2013.01); *G02C 2200/20* (2013.01); *G02C 2200/22* (2013.01)

(56) References Cited

U.S. PATENT DOCUMENTS

2008/0013040 A1* 1/2008 Anderl .................... G02C 5/008
 351/121
2012/0257159 A1* 10/2012 Silver .................... G02C 5/146
 351/116

* cited by examiner

SPECTACLES WITH INTERCHANGEABLE ARMS

TECHNICAL FIELD

The present invention relates to spectacles with interchangeable arms.

TECHNOLOGICAL BACKGROUND

The invention involves the specific technical field of frames for spectacles, for which there is provision for the lateral arms to be of the interchangeable type.

Such a prerogative meets the ever-increasing requirement for providing methods for personalizing the frame which allow people to associate with the front portion of the same frame arms of different shapes, materials and colours, using arms of the interchangeable type. One of the problems which can be seen in this field of personalization of the spectacles involves the fact that the technology of the interchangeable coupling systems of the arms at the front portions of spectacles may involve limitations because they do not have adequate dexterity and competence, in addition to suitable tools, typically having to operate on components of small dimensions with fitting and coupling devices, some also with screw type systems of small dimensions, which are rather complex, fragile and which involve the risk of deformations and breakages, with the result that they are also disadvantageous in terms of efficacy and reliability. In the prior art, there are known solutions which allow the use in spectacles of quick engagement systems for interchangeable arms, in which a series of arms can be connected to an end of a hinge element which is intended for articulation to the front portion, by means of a quick-fit mechanism with a snap-fit connection, which can also be readily handled by an inexpert person who is not provided with particular tools.

An example of such a coupling system is known from U.S. Pat. No. 6,834,952. The system described therein provides for the retention means, which is capable of axially fixing the portions which are fitted to each other, to be formed as a resiliently flexible push-button which, when it is pressed until the retention means is disengaged, allows the quick disengagement of the arm from the frame so as to facilitate the interchangeability thereof. In the specific field of those quick-fit engagement systems, one of the limitations is the one connected with the stability of the connection. In fact, those systems though, on the one hand, making it easy and quick to change the arm, on the other hand do not ensure adequate efficacy in terms of stability in respect of the connection between the fitted portions, as a result of connection play during the sliding engagement of the connected portions, which necessarily have to be provided in order to allow ease of movement during engagement and disengagement of the arm with respect to the front frame portion associated therewith.

DESCRIPTION OF INVENTION

A main object of the invention is to provide spectacles with interchangeable arms, which are structurally and functionally configured to overcome the limitations mentioned above with reference to the cited prior art.

This object and other objects which will be set out below are achieved by the invention by means of spectacles with interchangeable arms constructed in accordance with the appended claims.

BRIEF DESCRIPTION OF THE DRAWINGS

The features and advantages of the invention will be better appreciated from the following detailed description of a preferred embodiment thereof which is illustrated by way of non-limiting example with reference to the appended drawings, in which.

PREFERRED EMBODIMENT OF THE INVENTION

Figure 1:
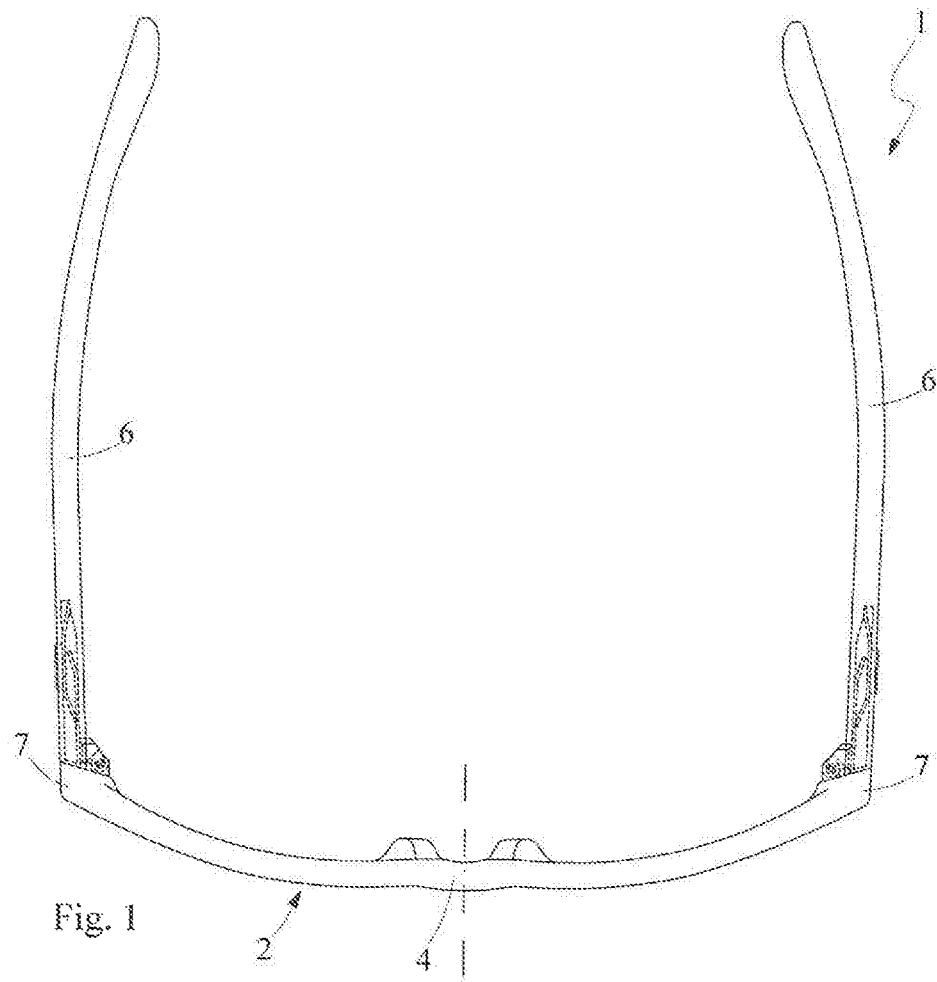
FIGS. 1 and 2 are a plan view and a side elevation of a frame for spectacles having interchangeable arms according to the invention, respectively.
Figure 2:
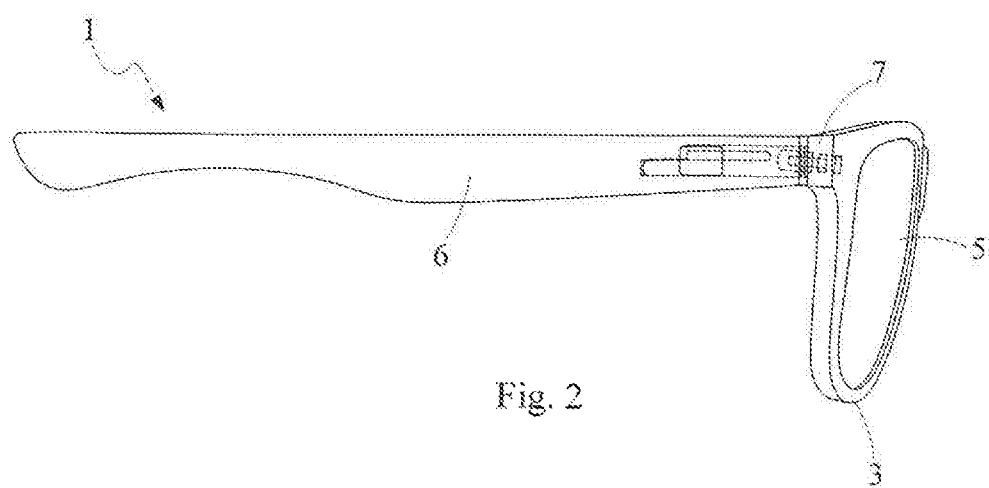
Figure 10:
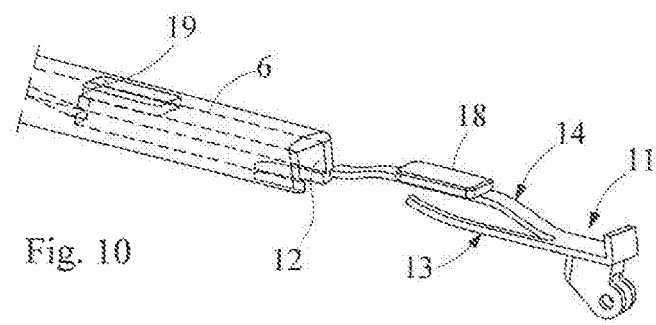
FIG. 10 is another perspective view of the detail illustrated in FIG. 3.
Figure 3:
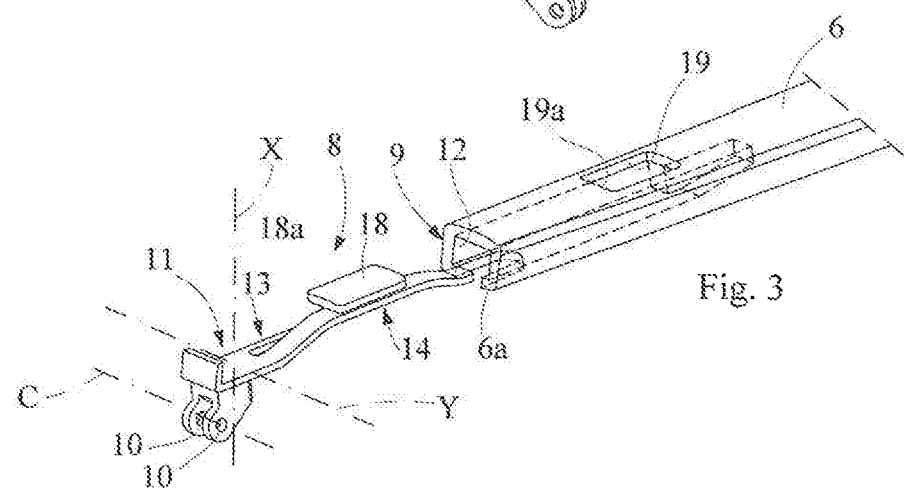
FIGS. 3 to 5 are partial, perspective views of a detail relating to the interchangeable arms of the spectacles of the preceding Figures, in different operating conditions.

With reference to the Figures cited, there is generally designated 1 a pair of spectacles of the type with interchangeable arms which are constructed according to the present invention.

The pair of spectacles comprises a front frame 2, including a pair of respective lens-carrying round members 3 which have a closed contour and which are connected by a central nose support zone 4. Each lens-carrying round member 3 is provided to receive and support a respective lens 5.

There are generally designated 6 both the lateral arms which are articulated to respective lugs 7 which are provided at laterally opposed sides of the front frame 2.

The pair of spectacles 1 further comprises a removable coupling device for each arm 6 with respect to the corresponding lug 7 of the frame; only one of those devices will be described in detail below owing to their identical nature, except for the potential construction of right and left components for the assembly of each device.

The coupling device comprises a first and a second coupling element which are designated 8 and 9, respectively, and which are slidingly engaged one in the other in the direction towards and away from a mutual retention position and which are provided for quick disengagement from that position.

The first element 8 is intended for hinged connection to the respective lug 7 of the frame and, for that purpose, comprises at one end thereof a pair of hinge type holes 10 which are suitable for cooperating with a corresponding hole 10' which is mounted on the lug 7, for articulated connection with a hinge pin (not illustrated) which is engaged in the holes 10, 10'. The hinge axis of the articulated connection is designated C.

Figure 7:
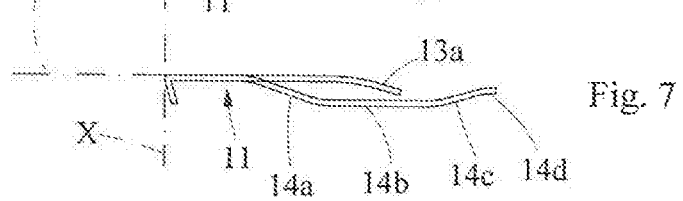

The first element 8 further comprises a body 11 which is formed by a strip, in particular by a metal strip, of reduced thickness, in which a theoretical strip plane which is designated P may be defined and is understood to extend parallel with the opposite surfaces of the strip (between which the thickness of the strip is delimited) when considered in a non-deformed flat configuration. The plane is defined in FIG. 7 with an axis which is designated P.

The second coupling element 9 comprises a seat 12 which is provided in the body of the arm 6 and which is capable of being slidingly engaged by the strip-shaped body 11. The seat 12 is defined by a blind hole which is elongate in the direction of longitudinal development of the arm 6 from an end 6a thereof which faces the lug 7. At that end, the hole which defines the seat is open so as to define a mouth for the insertion of the strip-shaped body 11. As will be appreciated more clearly below, resiliently flexible retention means are provided between the coupling elements 8, 9 of each arm 6 in order to mutually fix and retain the elements, in an axial direction, in a removable manner, by means of a snap-fit coupling system.

The strip-shaped body 11 is provided with a first and a second strip branch 13, 14 which extend from a common portion 15 of the strip-shaped body and which have predominant longitudinal extents in directions parallel with each other. The strip branches 13, 14 further extend with spacing from each other both in a first direction X substantially perpendicular to the strip plane P and in a second direction Y substantially parallel with the strip plane P. As a result of that configuration, the strip branches 13, 14 have such overall dimensions in the two directions X and Y that the branches are capable of engaging with the seat 12 of the arm, abutting pairs of opposing inner surfaces 12a, 12b and 12c, 12d of the seat, respectively, in the first direction (X) and in the second direction (Y). That abutment is brought about by the effect of a resilient stress brought about in the strip branches 13, 14 in those directions, and produced by the interference between the seat 12 and the strip-shaped body 11 during the mutual relative sliding movement when the strip is inserted into the seat until it reaches the relative axial retention position.

In greater detail, the strip branch 13 extends mainly parallel with the strip plane P except for an end portion 13a thereof, which is inclined in the direction of the other branch. That branch 13 further has a transverse extent, measured parallel with the strip plane in the direction Y, which is smaller than the corresponding transverse extent of the branch 14.

Figure 8:
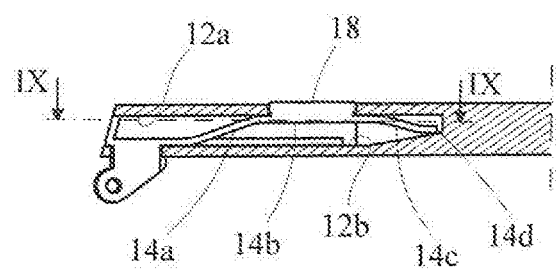
FIG. 8 is an axial section of the detail of FIG. 5.

The strip branch 14 extends from the portion 15 with a first portion 14a which is inclined so as to project from the strip plane, extending into a second portion 14b which is substantially parallel with the strip plane, which in turn extends into a third portion 14c which is inclined so as to converge towards the strip plane. The third portion 14c further extends into a fourth end portion 14d which has a rectilinear profile which is substantially parallel with the strip plane and with spacing therefrom, as clearly illustrated in the configuration of the strip-shaped body 11 illustrated in FIG. 8.

Figure 9:
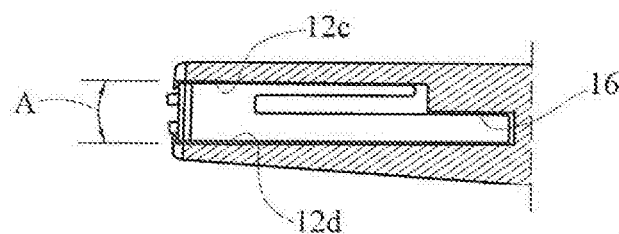
FIG. 9 is a cross-section along the line IX-IX of FIG. 8.

With reference to FIG. 9, the strip branch 13 has a longitudinal extent less than the branch 14. The end portion of greater extent than the branch 14 is further received in a respective end portion 16 of the hole which defines the seat 12. In that portion, the surface base portion 12b has a profile having an inclined plane which is directed towards the opposite surface 12a, whose function will be set out clearly in the following description.

There is generally designated 18 a plate-like appendage which is fixed to the strip branch 14 in the region of the portion 14b, which is formed in order to engage, with substantial form-fitting, with a through-aperture 19 in the body of the arm. The opening opens in the direction towards the interior of the seat 12, in the region of the surface 12a.

Figure 5:
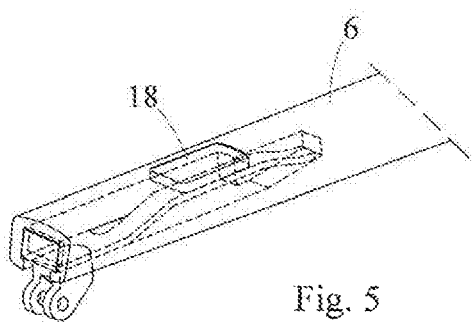

There is defined on the appendage 18 a bearing surface 18a which is capable of interfering with a surface stop 19a which is defined by the thickness of a portion of the contour profile of the aperture 19, in such a manner that the appendage can act as an axial retention means for the strip body 11 inside the seat 12, in order to axially fix the arm 6 with the strip-shaped body 11 when the mutual retention position is reached, in which the appendage 18 is resiliently urged to engage with the aperture 19 (FIG. 5).

Figure 4:
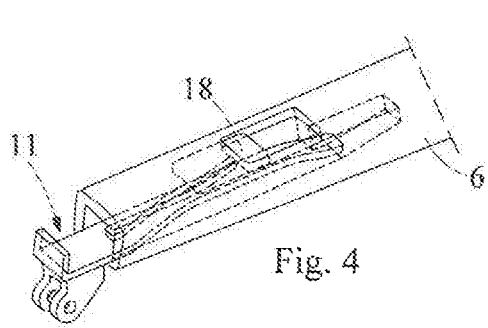

From that position, the free sliding of the strip-shaped body 11 in the seat may be brought about as a result of pressure applied to the appendage 18, counter to the resilient biasing of the strip-shaped body 11, in order to disengage the aperture 19 (bearing surface 18a moved away from the stop 19a) and to allow the relative sliding of the strip out of the seat 12 (FIG. 4). As a result, the appendage 18 acts both as a retention means and as a push type means, to which pressure may be applied in order to allow the quick disengagement of the strip-shaped body from the arm.

Figure 6:
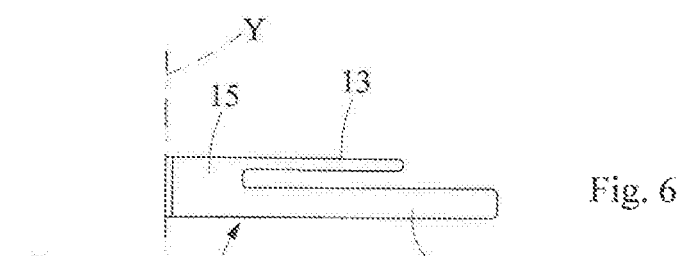
FIGS. 6 and 7 are a plan view and a side elevation of another detail of the preceding Figures, respectively.

With reference to FIG. 6, the spatial requirement of the strip-shaped body 11 measured in the strip plane P in the second direction Y is substantially constant.

Furthermore, the internal transverse dimension of the seat 12 of the arm, measured between the opposing walls 12a, 12b, in the first direction X, is smaller than the corresponding lateral overall dimension of the strip-shaped body 11 when considered in the non-deformed condition. As a result of that configuration, during insertion of the strip-shaped body into the seat, the strip-shaped body is resiliently deformed (by the effect of the coupling interference) in the first direction X, becoming reduced in terms of width. Owing to the effect of the different dimensions of the branches 13, 14, the more flexible branch 13 is what is caused to flex laterally during the engagement of the strip in the seat.

When the strip-shaped body is completely fitted in the seat, with the appendage 18 received in engagement in the aperture 19 (as a result of the effect of the resilient return brought about by the deformation of the strip), there is still produced in the strip-shaped body a resilient biasing which tends to press the strip against the opposing internal side walls 12a, 12b of the seat, reducing and at most eliminating any coupling play in the direction X, therefore in favour of the stability of the relative mutual fitting between the strip and the seat.

The internal transverse dimension of the seat 12, measured between the opposing walls 12c, 12d, in the second direction Y, is not constant in the direction of axial extent of the seat. In fact, there is provision for the walls 12c, 12d to have a predetermined conicity so that they are inclined relative to each other at an angle A of taper which is open towards the mouth of the seat. A preferred selection provides for an angle of taper of 0.5°, with walls being mutually inclined as far as the narrow base portion 16 of the seat.

Owing to the effect of this progressive narrowing of the seat 12, the strip-shaped body 11 (which has a constant transverse dimension which is equal to the dimension of the mouth of the seat) is subjected, during the engaging sliding in the seat, to a resilient deformation in the direction Y. In reality, the branch 13 which is more flexible is what tends to give way in a resilient manner, being bent in the direction of the branch 14. That deformation of the strip, which brings about a consequent urging of a resilient type, brings about a type of interference coupling which ensures coupling stability of the strip-shaped body inside the seat, compensating for any coupling play owing to differences in dimension.

It may be observed how the coupling stability is obtained simultaneously both in the X direction and in the Y direction, as a result of the deformations brought about in the strip-shaped body in those directions owing to the effect of the interference between the strip and the seat during relative sliding until the mutual retention position is reached, in which the retention appendage 18 ensures the axial fixing between the coupling elements 8, 9.

The inclined surface potion 12b, in the region of the base portion 16 of the seat, is formed so as to facilitate the disengagement step of the strip-shaped body from the seat of the arm. When a pressure is applied to the push-in appendage 18 from the outer side of the arm, the branch 14 of the strip-shaped body which is fixedly joined to the appendage becomes resiliently deformed in order to allow the appendage to move inside the seat 12 (disengaging from the aperture 19), thereby releasing the axial sliding of the strip-shaped body in relation to the seat, for the removal thereof. During the pressure on the push-in appendage 18, the branch 14 abuts the inclined portion of the surface 12b, that inclination guiding the strip to the correct deformation which is suitable for making the disengagement easier, preventing it from striking the wall of the seat opposite the push-in appendage.

The example described provides for the strip plane P of the body 11 to be orientated substantially parallel with the hinge axis C. According to that configuration, the push-in retention appendage 18 is provided on the lateral face of the arm, which remains in view with the spectacles being worn.

It should be understood that a different orientation of the device inside the arm is still possible, although the one described is a preferred selection. For example, by way of an alternative, it is possible to provide for the device to be orientated in such a manner that the hinge axis C is perpendicular to the strip plane P (that is to say, the second direction Y), in a configuration rotated through 90° with respect to the one described above, in which the push-in appendage would be positioned below the arm, and therefore no longer in view with the spectacles being worn.

The invention thereby achieves the objects set out by bringing about the advantages set out with respect to the known solutions.

A main advantage is that, as a result of the invention, there is obtained an improved stability during the coupling of the interchangeable type of the arm on the front frame of the spectacles. There is an improvement in the interference engagement between the coupled portions with any coupling play being eliminated, allowing at the same time the ease and simplicity of actuation of the quick disengagement of the arm from the frame for the function of interchangeability of the arm itself.

The invention claimed is:

1. Spectacles with interchangeable arms (6), the spectacles comprising:
    a front frame (2) with opposed lateral lugs (7) for the hinged pivoting of the respective lateral arms (6),
    a device for the removable coupling of each arm (6) to the frame (2), the device comprising a first and a second coupling element (8, 9), engaged in each other so as to be slidable from and towards a position of mutual retention, the elements being configured for quick disengagement from this position,
    the first coupling element (8) being intended for the hinged connection to the corresponding lug (7) of the frame (2), and the second element (9) comprises a seat (12) which is provided in the corresponding arm (6) and which can be slidingly engaged by the first element (8),
    a resiliently flexible retainer being provided between the coupling elements (8, 9) of each arm (6) to fix these elements to each other in a removable manner, by means of a snap-fitting coupling,
    wherein the first coupling element (8) comprises a strip-shaped body (11) with a first and a second branch (13, 14) of the strip extending from a common portion (15) and having their predominant longitudinal extents in directions parallel with each other, the first and second branches (13, 14) being spaced apart and extending in a first plane (X) substantially orthogonal to the strip plane (P) and are spaced apart and extend in a second plane (Y) substantially co-planar with the strip plane (P), in such a manner that the first and second branches (13, 14) of the strip can engage the seat (12) in the arm (6) by bearing against opposing inner surfaces (12a, b; 12c, d) of the seat (12) in both the first plane (X) and the second plane (Y), as a result of a resilient stress created in the first and second branches (13, 14) of the strip in the first and second planes (X, Y) which are substantially orthogonal to each other.

2. The spectacles according to claim 1, wherein the first coupling element (8) is made of a metal strip, and wherein the first and second branches (13, 14) are subjected to resilient deformation so as to exert a resilient return force towards the non-deformed position, this resilient return force being created in the first and second branches (13, 14) of the strip by the deformation of the strip, along said first and second planes (X, Y), substantially orthogonal to each other, as a result of its frictional fitting into the seat (12) of the corresponding arm (6).

3. The spectacles according to claim 2, wherein the retainer comprises a bearing surface (18a) of a push-in appendage (18) provided on one of the first and second branches (13, 14) of the strip, the bearing surface (18a) being capable of interfering with a surface stop (19a) of the arm after the completion of the step of fitting the first element (8) into the second element (9), so as to fix these elements axially, the bearing surface (18a) and the stop (19a) being disengaged, for the purpose of allowing these elements (8, 9) to slide relative to each other, as a result of pressure exerted on the push-in appendage (18) in opposition to the resilient return force of the corresponding branch of the strip.

4. The spectacles according to claim 3, wherein the push-in appendage (18) is housed in a through-aperture (19) of the arm (6) in the position of mutual retention of the coupling elements (8, 9), the stop (19a) being formed in the thickness of the aperture (19) along the contour profile of the aperture.

5. The spectacles according to claim 4, wherein the second branch (14) of the strip has overall dimensions both in the longitudinal direction of extent and transversely to this direction which are greater than the corresponding overall dimensions of the first branch (13) of the strip, the push-in appendage (18) being provided in a portion of the second branch (14) of the strip.

6. The spectacles according to claim 1, wherein an internal transverse dimension of the seat (12) in the arm, measured in the first plane X, is smaller than an corresponding lateral overall dimension of the strip-shaped body (11) in the non-deformed condition, so that the frictional fitting of the strip-shaped body (11) into the seat (12) creates a resilient deformation in the strip-shaped body (11), such that a resilient stress is generated at least in the first plane (X).

7. The spectacles according to claim 6, wherein the internal transverse dimension of the seat (12) in the arm, measured in the second plane (Y), is smaller than the corresponding lateral overall dimension of the strip-shaped body (11) in the non-deformed condition, so that the frictional fitting of the strip-shaped body (11) into the seat (12)

creates a resilient deformation of the strip-shaped body, resulting in a resilient stress in the second plane (Y).

8. The spectacles according to claim 7, wherein opposing inner surfaces (12*c*, 12*d*) of the seat (12), facing each other in the second plane (Y), are inclined at a predetermined angle of taper to each other, with the angle (A) of taper opening towards the mouth of the seat (12).

9. The spectacles according to claim 8, wherein the inner surface (12*b*) of the seat (12), opposed to the through-aperture (19), has a terminal portion inclined towards the opposed inner surface (12*a*), the inclined portion being capable of interfering with a terminal portion of the second branch (14) of the strip which extends at the free end of this second branch (14).

10. The spectacles according to claim 3, wherein the first coupling element (8) comprises a hinge element (10) extending from the strip-shaped body (11), in which a hinge axis (C) is defined for the pivoting connection about the hinge axis (C) to a second hinge element (10') provided on the lug of the frame, the strip-shaped body (11) being shaped in such a manner that the hinge axis (C) is substantially orthogonal to or parallel with the first plane (X), in such a manner that the push-in appendage (18) is provided, respectively, laterally in the arm (6) or in a position rotated through 90°.

* * * * *